US00RE35966E

United States Patent [19]

Lee

[11] E Patent Number: Re. 35,966

[45] Reissued Date of Patent: Nov. 24, 1998

[54] PAPERMAKERS FABRIC WITH ORTHOGONAL MACHINE DIRECTION YARN SEAMING LOOPS

[75] Inventor: Henry J. Lee, Greenville, S.C.

[73] Assignee: Asten, Inc., Charleston, S.C.

[21] Appl. No.: 674,798

[22] Filed: Jul. 3, 1996

Related U.S. Patent Documents

Reissue of:

[64] Patent No.: 5,411,062
Issued: May 2, 1995
Appl. No.: 111,303
Filed: Aug. 23, 1993

U.S. Applications:

[63] Continuation-in-part of Ser. No. 949,044, Sep. 21, 1992, Pat. No. 5,238,027, which is a continuation-in-part of Ser. No. 715,543, Jun. 14, 1991, Pat. No. 5,148,838, which is a continuation of Ser. No. 567,974, Aug. 15, 1990, Pat. No. 5,092,373, which is a continuation-in-part of Ser. No. 534, 164, Jun. 6, 1990, Pat. No. 5,103,874.

[51] Int. Cl.[6] ..... D03D 13/00; D03D 15/00

[52] U.S. Cl. ..... 139/383 AA

[58] Field of Search ..... 139/383 AA, 383 A; 428/193

[56] References Cited

U.S. PATENT DOCUMENTS

| | | |
|---|---|---|
| 926,310 | 6/1909 | Zepp et al. . |
| 1,050,406 | 1/1913 | Veit . |
| 1,268,788 | 6/1918 | Brooks . |
| 1,775,144 | 9/1930 | Sherman . |
| 1,830,620 | 11/1931 | Pelton . |
| 2,093,904 | 9/1937 | Bierer . |
| 2,135,057 | 11/1938 | Slayter et al. . |
| 2,570,576 | 5/1951 | Lord . |
| 2,854,032 | 8/1958 | Santos . |

(List continued on next page.)

FOREIGN PATENT DOCUMENTS

| | | | |
|---|---|---|---|
| 2407291 | 5/1979 | European Pat. Off. | D21F 5/02 |
| 144592 | 6/1985 | European Pat. Off. | D21F 1/00 |
| 211426 | 2/1987 | European Pat. Off. | D21F 1/00 |
| 0273892 | 7/1988 | European Pat. Off. | B01D 39/08 |
| 0553501 | 8/1993 | European Pat. Off. | D21F 1/00 |
| 3225599 | 12/1984 | Germany | D03D 1/00 |
| 3426264 | 1/1986 | Germany | D21F 7/08 |
| 1362684 | 8/1974 | United Kingdom | D03D 15/00 |

OTHER PUBLICATIONS

J.F. Oliver and N. Nieman; Water Removal In Wet Pressing: The Effect Of Felt Roughness; Dec. 1978; pp. Tr 104–TR 109. Canadian Pulp & Paper Assc.

L.H. Busker and D.C. Cronin; The Relative Importance of Wet Press Variables In Water Removal; 1982; pp. 25–34. Rockton Res. & Dev. Lab. Beloit Corp., Rockton Ill.

D. Attwood et al; Drying Of Paper And Paperboard; 1972; pp. 68–83. Lockwood Publishing Co. New York.

*Primary Examiner*—Andy Falik
*Attorney, Agent, or Firm*—Volpe and Koenig, P.C.

[57] ABSTRACT

A flat woven pin-seamed papermakers fabric wherein machine direction yarns define a series of seaming loops on the opposing fabric ends. The fabric comprises a system of flat monofilament machine direction warp yarns (hereinafter MD yarns) which are woven in a selected weave construction. In a preferred embodiment, the system of MD yarns comprises upper and lower yarns which are vertically stacked. Selected end segments of the upper and lower MD yarns are removed and yarn segments made of a more durable material are rewoven into the fabric end in the space vacated by the trimmed upper and lower MD yarn end segments. Non-loop forming upper MD yarns are preferably backwoven into the space vacated by trimming respective lower MD yarns. Preferably, at least the upper MD yarns are woven contiguous with each other to lock in the machine direction alignment of the stacking pairs of MD yarns and the orthogonal orientation of the end loops. The seaming loops of the opposing ends are intermeshed and joined via a pintle yarn. The permeability of the seam area is controlled via the inserting of rectangular stuffer yarns parallel to the pintle yarn.

18 Claims, 5 Drawing Sheets

U.S. PATENT DOCUMENTS

| | | |
|---|---|---|
| 3,622,415 | 11/1971 | Kunsman . |
| 3,815,645 | 6/1974 | Codorniu . |
| 3,885,603 | 5/1975 | Slaughter . |
| 4,026,331 | 5/1977 | Lees et al. . |
| 4,095,622 | 6/1978 | MacBean . |
| 4,123,022 | 10/1978 | Dutt et al. . |
| 4,142,557 | 3/1979 | Kositzke . |
| 4,182,381 | 1/1980 | Gisbourne . |
| 4,290,209 | 9/1981 | Buchanan et al. . |
| 4,351,874 | 9/1982 | Kirby . |
| 4,356,225 | 10/1982 | Dufour . |
| 4,379,735 | 4/1983 | MacBean . |
| 4,381,612 | 5/1983 | Shank . |
| 4,414,263 | 11/1983 | Miller et al. . |
| 4,438,788 | 3/1984 | Harwood . |
| 4,438,789 | 3/1984 | MacBean . |
| 4,461,803 | 7/1984 | Booth et al. . |
| 4,469,142 | 9/1984 | Harwood . |
| 4,515,853 | 5/1985 | Borel . |
| 4,529,013 | 7/1985 | Miller . |
| 4,537,816 | 8/1985 | Booth et al. . |
| 4,565,735 | 1/1986 | Murka, Jr. et al. . |
| 4,569,375 | 2/1986 | Borel . |
| 4,601,785 | 7/1986 | Lilja et al. . |
| 4,621,663 | 11/1986 | Malmendier . |
| 4,658,863 | 4/1987 | Errecart . |
| 4,676,278 | 6/1987 | Dutt . |
| 4,695,498 | 9/1987 | Sarrazin et al. . |
| 4,705,601 | 11/1987 | Chiu . |
| 4,737,241 | 4/1988 | Gulya . |
| 4,749,007 | 6/1988 | Malmendier . |
| 4,755,420 | 7/1988 | Baker et al. . |
| 4,815,499 | 3/1989 | Johnson . |
| 4,824,525 | 4/1989 | Penven . |
| 4,846,231 | 7/1989 | Penven . |
| 4,863,786 | 9/1989 | Green et al. . |
| 4,865,083 | 9/1989 | Cunnane . |
| 4,867,206 | 9/1989 | Kufferath . |
| 4,883,096 | 11/1989 | Penven . |
| 4,887,648 | 12/1989 | Cunnane . |
| 4,902,383 | 2/1990 | Penven . |
| 4,921,750 | 5/1990 | Todd . |
| 4,938,269 | 7/1990 | Nicholas et al. . |
| 4,979,543 | 12/1990 | Moriarty et al. . |
| 4,989,647 | 2/1991 | Marchand . |
| 4,991,630 | 2/1991 | Penven . |
| 4,995,429 | 2/1991 | Kositzke . |
| 5,053,109 | 10/1991 | Penven . |
| 5,066,532 | 11/1991 | Gaisser . |
| 5,089,324 | 2/1992 | Jackson . |
| 5,092,373 | 3/1992 | Lee . |
| 5,103,874 | 4/1992 | Lee . |
| 5,104,724 | 4/1992 | Hsu . |
| 5,114,777 | 5/1992 | Gaisser . |
| 5,148,838 | 9/1992 | Lee . |
| 5,164,249 | 11/1992 | Tyler et al. . |
| 5,169,709 | 12/1992 | Fleischer . |
| 5,199,467 | 4/1993 | Lee . |

PAPERMAKERS FABRIC WITH ORTHOGONAL MACHINE DIRECTION YARN SEAMING LOOPS

Matter enclosed in heavy brackets [ ] appears in the original patent but forms no part of this reissue specification; matter printed in italics indicates the additions made by reissue.

This application is a continuation-in-part of my application, No. 07/949,044, entitled PAPERMAKERS FABRIC WITH ORTHOGONAL MACHINE DIRECTION YARN SEAMING LOOPS, filed Sep. 21, 1992, U.S. Pat No. 5,238,027 which is a continuation-in-part of my application, No. 07/715,543, entitled PAPERMAKERS FABRIC WITH ORTHOGONAL MACHINE DIRECTION YARN SEAMING LOOPS, filed Jun. 14, 1991, U.S. Pat. No. 5,148,838 which is a continuation of my application 07/567,974, entitled PAPERMAKERS FABRIC WITH ORTHOGONAL MACHINE DIRECTION YARN SEAMING LOOPS, filed Aug. 15, 1990, U.S. Pat No. 5,092,373 which is a continuation-in-part of my application No. 07/534,164, entitled PAPERMAKERS FABRIC WITH STACKED MACHINE DIRECTION YARNS, filed Jun. 6, 1990 U.S. Pat. No. 5,103,874.

The present invention relates to papermakers fabrics and in particular to pin-seamed fabrics.

BACKGROUND OF THE INVENTION

Papermaking machines generally are comprised of three sections: forming, pressing, and drying. Papermakers fabrics are employed to transport a continuous paper sheet through the papermaking equipment as the paper is being manufactured. The requirements and desirable characteristics of papermakers fabrics vary in accordance with the particular section of the machine where the respective fabrics are utilized.

With the development of synthetic yarns, shaped monofilament yarns have been employed in the construction of papermakers fabrics. For example, U.S. Pat. No. 4,290,209 discloses a fabric woven of flat monofilament warp yarns; U.S. Pat No. 4,755,420 discloses a non-woven construction where the papermakers fabric is comprised of spirals made from flat monofilament yarns.

In use, papermakers fabrics are configured as endless belts. Weaving techniques are available to initially weave fabrics endless. However, there are practical limitations on the overall size of endless woven fabrics as well as inherent installation difficulties. Moreover, not all papermaking equipment is designed to accept the installation of an endless fabric.

Flat woven fabrics are often supplied having opposing ends which are seamed together during installation of the fabric on papermaking equipment. Usually one end of the fabric is threaded through the serpentine path defined by the papermaking equipment and is then joined to its opposing end to form a continuous belt.

A variety of seaming techniques are well known in the art. One conventional method of seaming is to form the machine direction yarns on each end of the fabric into a series of loops. The loops of the respective fabric ends are then intermeshed during fabric installation to define a channel through which a pintle is inserted to lock the ends together.

For example, U.S. Pat. Nos. 4,026,331; 4,438,789; 4,469,142; 4,846,231; 4,824,525 and 4,883,096 disclose a variety of pin seams wherein the machine direction yarns are utilized to form the end loops. In each of those patents, however, the machine direction yarn projects from the end of the fabric and weaves back into the fabric adjacent to itself. Accordingly, the loops inherently have a twist or torque factor and are not entirely orthogonal to the plane of the fabric. U.S. Pat. 4,883,096 specifically addresses this problem. It is desirable to provide a papermakers fabric with machine direction seaming loops which do not have torque and/or twist.

The seam is an inherent discontinuity in the papermakers fabric. Accordingly, when in use, the seam of a fabric wears differently than the remainder of the fabric. Excessive wear on the seam can lead to the need to replace the papermakers fabric thereby shortening the fabrics useful life.

It would be desirable to provide a papermakers fabric having a seam with increased durability.

SUMMARY AND OBJECTS INVENTION

The present invention is directed to a woven, pin-seamed papermakers fabric wherein a series of seaming loops are defined on the opposing fabric ends. In a preferred embodiment, the fabric comprises a system of flat monofilament machine direction yarns (hereinafter MD yarns) which are woven in a selected weave construction. The preferred system of MD yarns comprises upper and lower yarns which are vertically stacked. End segments of selected upper and lower MD yarn pairs are removed and yarns made of a more durable material are rewoven into the fabric end in the space vacated by the trimmed upper and lower MD yarn end segments to form end loops. In one example, the MD yarns are made of polyester and the selected loop forming yarn segments are made of polyetheretherketone (PEEK).

It is not necessary that all of the end loops are made of the more durable material to improve the durability of the seam. With respect to end loops which are not made of the more durable material, the upper MD yarns are used to form the end loops. End segments of the lower MD yarns are removed and the upper MD yarn ends are looped back upon themselves and rewoven into the fabric and in the space vacated by the trimmed lower MD yarn end segments. The lower MD yarns may weave in an inverted image of the upper MD yarns such that the crimp of the upper MD yarns conforms with the lower MD yarn weave pattern space into which the upper MD yarn ends are backwoven. This improves the strength of the seam.

End loops are not formed at the ends of alternate upper and lower yarn pairs. Where end loops are not formed, the upper MD yarns are backwoven into the space vacated by trimming the respective lower MD yarns.

Preferably, at least the upper MD yarns are woven contiguous with each other to lock in the machine direction alignment of the stacking pairs of MD yarns and the orthogonal orientation of the end loops. In the preferred embodiment, the same geometric shape and size yarns are used throughout the machine direction yarn system including the loop forming yarn segments.

The opposing fabric ends are joined by intermeshing the respective series of seaming loops and inserting a connecting pintle through the intermeshed loops.

In order to reduce permeability of the seaming area, stuffer yarns are preferably inserted through each series of seaming loops on either side of the joining pintle, but not within the intermeshed seaming loop area which the pintle occupies. Preferably, stuffer yarns having a rectangular cross-section are used.

DETAILED DESCRIPTION OF PRESENTLY PREFERRED EMBODIMENTS

Figure 1:
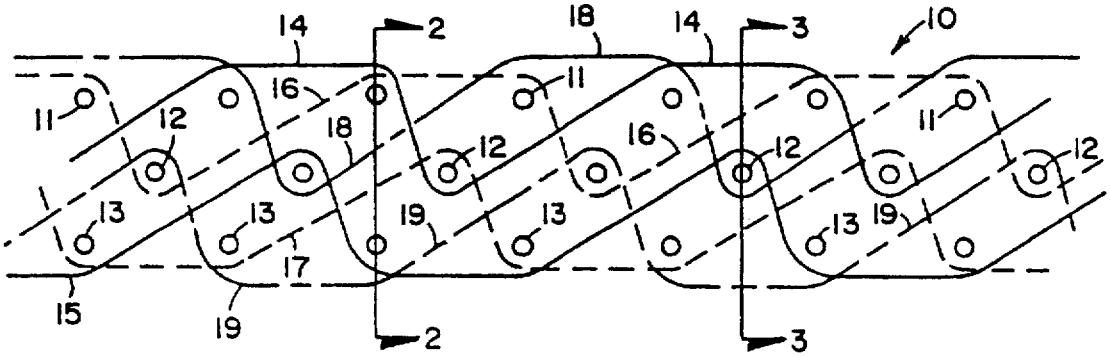
FIG. 1 is a schematic diagram of a papermakers fabric made in accordance with the teachings of the present invention.
Figure 2:
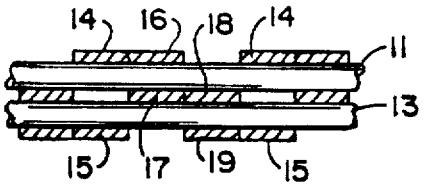
FIG. 2 is a cross-sectional view of the fabric depicted in FIG. 1 along line 2—2.
Figure 3:
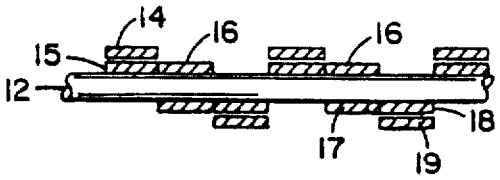
FIG. 3 is a cross-sectional view of the fabric depicted in FIG. 1 along line 3—3.

Referring to FIGS. 1, 2, and 3, there is shown a papermakers dryer fabric 10 comprising upper, middle and lower layers of cross machine direction (hereinafter CMD) yarns 11, 12, 13, respectively, interwoven with a system of MD yarns 14–19 which sequentially weave in a selected repeat pattern. The MD yarn system comprises upper MD yarns 14, 16, 18 which interweave with CMD yarns 11, 12 and lower MD yarns 15, 17, 19 which interweave with CMD yarns 12, 13.

The upper MD yarns 14, 16, 18 define floats on the top surface of the fabric 10 by weaving over two upper layer CMD yarns 11 dropping into the fabric to weave in an interior knuckle under one middle layer CMD yarn 12 and under one CMD yarn 11 and thereafter rising to the surface of the fabric to continue the repeat of the yarn. The floats over upper layer CMD yarns 11 of upper MD yarns 14, 16, 18 are staggered so that all of the upper and middle layer CMD yarns 11, 12 are maintained in the weave.

As will be recognized by those skilled in the art, the disclosed weave pattern with respect to FIGS. 1, 2, and 3, results in the top surface of the fabric having a twill pattern. Although the two-float twill pattern represented in FIGS. 1, 2, and 3 is a preferred embodiment, it will be recognized by those of ordinary skill in the art that the length of the float, the number of MD yarns in the repeat, and the ordering of the MD yarns may be selected as desired so that other patterns, twill or non-twill, are produced.

As best seen in FIGS. 2 and 3, lower MD yarns 15, 17, 19, weave directly beneath upper MD yarns 14, 16, 18, respectively, in a vertically stacked relationship. The lower yarns weave in an inverted image of their respective upper yarns. Each lower MD yarn 15, 17, 19 floats under two lower layer CMD yarns 13, rises into the fabric over one CMD yarn 13 and forms a knuckle around one middle layer CMD yarn 12 whereafter the yarn returns to the lower fabric surface to continue its repeat floating under the next two lower layer CMD yarns 13.

With respect to each pair of stacked yarns, the interior knuckle, formed around the middle layer CMD yarns 12 by one MD yarn, is hidden by the float of the other MD yarn. For example, in FIGS. 1 and 3, lower MD yarn 15 is depicted weaving a knuckle over CMD yarn 12 while MD yarn 14 is weaving its float over CMD yarns 11, thereby hiding the interior knuckle of lower MD yarn 15. Likewise, with respect to FIGS. 1 and 3, upper MD yarn 18 is depicted weaving a knuckle under yarn CMD yarn 12 while it is hidden by lower MD yarn 19 as it floats under CMD yarns 13.

The upper MD yarns 14, 16, 18, are woven contiguous with respect to each other. This maintains their respective parallel machine direction alignment and reduces permeability. Such close weaving of machine direction yarns is known in the art as 100% warp fill as explained in U.S. Pat. No. 4,290,209. As taught therein and used herein, actual warp count in a woven fabric may vary between about 80%–125% in a single layer and still be considered 100% warp fill.

The crowding of upper MD yarns 14, 16, and 18 also serves to force lower MD yarns 15, 17, 19, into their stacked position beneath respective upper MD yarns 14, 16, 18. Preferably lower MD yarns 15, 17, and 19 are the same size as upper MD yarns 14, 16, and 18 so that they are likewise woven in 100% warp fill. This results in the overall fabric of the preferred embodiment having 200% warp fill of MD yarns.

Since the lower MD yarns 15, 17, 19 are also preferably woven 100% warp fill, they likewise have the effect of maintaining the upper MD yarns 14, 16, 18 in stacked relationship with the respect to lower MD yarns 15, 17, 19. Accordingly, the respective MD yarn pairs 14 and 15, 16 and 17, 18 and 19 are doubly locked into position thereby enhancing the stability of the fabric.

As set forth in the U.S. Pat. No. 4,290,209, it has been recognized that machine direction flat yarns will weave in closer contact around cross machine direction yarns than round yarns. However, a 3:1 aspect ratio was viewed as a practical limit for such woven yarns in order to preserve overall fabric stability. The present stacked MD yarn system preserves the stability and machine direction strength of the fabric and enables the usage of yarns with increased aspect ratio to more effectively control permeability.

The high aspect ratio of the MD yarns translates into reduced permeability. High aspect ratio yarns are wider and thinner than conventional flat yarns which have aspect ratios less than 3:1 and the same cross-sectional area. Equal cross-sectional area means that comparable yarns have substantially the same linear strength. The greater width of the high aspect ratio yarns translates into fewer interstices over the width of the fabric than with conventional yarns so that fewer openings exist in the fabric through which fluids may flow. The relative thinness of the high aspect ratio yarns enables the flat MD yarns to more efficiently cradle, i.e. brace, the cross machine direction yarns to reduce the size of the interstices between machine direction and cross machine direction yarns.

Figure 4A:
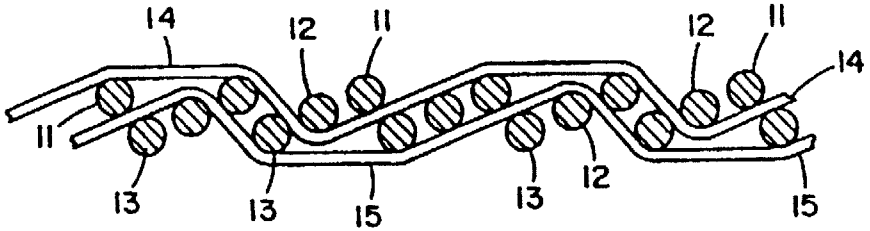
FIG. 4a illustrates the yarn orientation in the fabric depicted in FIG. 1 after the fabric is finished showing only two representative stacked MD yarns.

As illustrated in FIG. 4a, when the fabric 10 is woven the three layers of CMD yarns 11, 12, 13 become compressed. This compression along with the relatively thin dimension of the MD yarns reduces the caliper of the fabric. Accordingly, the overall caliper of the fabric can be maintained relatively low and not significantly greater than conventional fabrics woven without stacked MD yarn pairs. In the above example, the caliper of the finished fabric was 0.050 inches.

It will be recognized by those of ordinary skill in the art that if either top MD yarns 14, 16, 18 or bottom MD yarns 15, 17, 19 are woven at 100% warp fill, the overall warp fill for the stacked fabric will be significantly greater than 100% which will contribute to the reduction of permeability of the fabric. The instant fabric having stacked MD yarns will be recognized as having a significantly greater percentage of a warp fill than fabrics which have an actual warp fill of 125% of non-stacked MD yarns brought about by crowding and lateral undulation of the warp strands. Although the 200% warp fill is preferred, a fabric may be woven having 100% fill for either the upper or lower-MD yarns with a lesser degree of fill for the other MD yarns by utilizing yarns which are not as wide as those MD yarns woven at 100% warp fill. For example, upper yarns 14, 16, 18 could be 1 unit wide with lower layer yarns 15, 17, 19 being 0.75 units wide which would result in a fabric having approximately 175% warp fill.

Such variations can be used to achieve a selected degree of permeability. Alternatively, such variations could be employed to make a forming fabric. In such a case, the lower MD yarns would be woven 100% warp fill to define the machine side of the fabric and the upper MD yarns would be woven at a substantially lower percentage of fill to provide a more open paper forming surface.

Figure 4B:
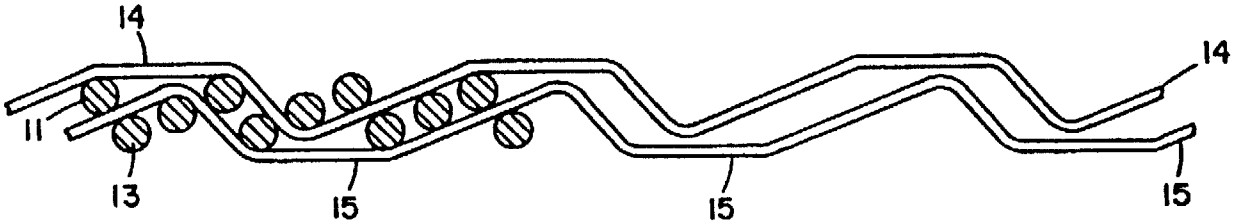
FIGS. 4b, 4c, and 4d are a series of illustrations showing the formation of a seaming loop for the papermakers fabric depicted in FIG. 1.
Figure 4C:
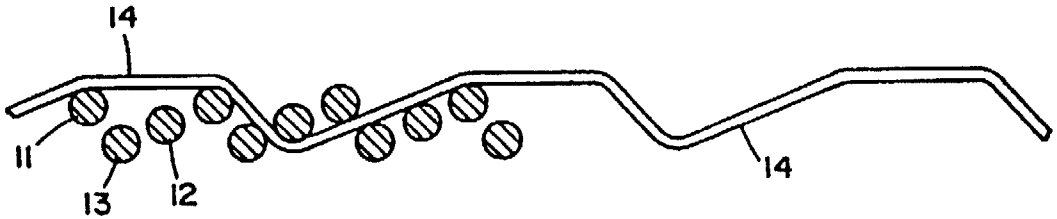
Figure 4D:
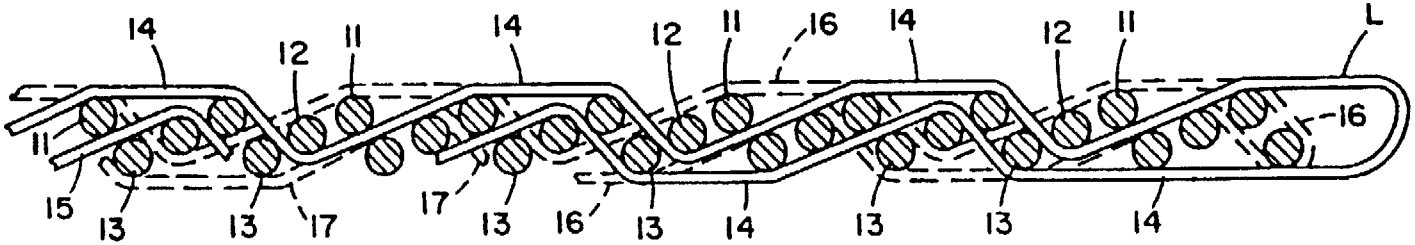

The stacked pair MD weave permits the formation of orthogonal seaming loops within MD yarns. With reference to FIGS. 4a–d, after the fabric has been woven and heat set (FIG. 4a), CMD yarns are removed leaving the crimped MD yarns 14, 15 exposed (FIG. 4b). One of the yarns, for example, MD lower yarn 15, of the stacked pair is trimmed back a selected distance leaving the other exposed MD yarn 14 of the MD yarn pair and vacated space between the CMD yarns, as illustrated in FIG. 4c. Upper MD yarn 14 is then backwoven into the space vacated in the weave pattern by lower MD yarn 15 such that a loop L is formed on the end of the fabric, as illustrated in FIG. 4d. Preferably, between 0.5–5.0 inches of upper layer yarn 14 is backwoven into the fabric to provide sufficient strength for the end loop and assure retention of the free end of MD yarn 14 within the weave of the fabric. The inverted image weave permits the crimp of the upper MD yarn 14 to match the space vacated by the lower MD yarn 15 which further enhances the strength of the end loop.

As shown in phantom in FIG. 4d, adjacent yarn pair 16, 17 is processed in a similar manner. However, when upper yarn 16 is looped back and backwoven in the fabric, it is pulled against the CMD yarns. In the preferred embodiment, wherein the upper MD yarns are woven 100% fill, the crowding of the yarns secure the orthogonal orientation of the seaming loops.

To achieve a uniform seam for a fabric woven in accordance with the weave pattern depicted in FIGS. 1–4, each upper MD yarn 14 forms a loop and the other upper MD yarns 16, 18 are backwoven against the endmost CMD yarn of the fabric. Thus every third upper MD yarn defines a loop such that an array of loops is created on each end of the fabric. The seam is assembled by intermeshing the opposing arrays of loops and inserting a pintle yarn between the intermeshed loops.

Preferably, loop forming yarns 14 would all be backwoven approximately the same distance within the fabric to provide sufficient strength to prevent the loops from being pulled apart during normal usage. Non-loop forming yarns 16, 18, would preferably be backwoven a somewhat shorter distance since during usage no load is imparted to those yarns. For example, upper MD yarns 14 would be backwoven approximately 3 inches, MD yarns 16 would be backwoven approximately 2 inches, and MD yarns 18 would be backwoven approximately 1 inch. Respective lower layer yarns 15, 17, 19 would be trimmed to complement the backweaving of their respective MD yarn pair yarns 14, 16, 18.

Figure 5A:
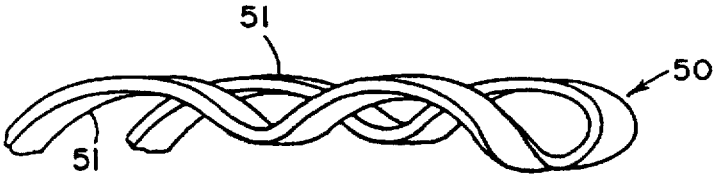
FIG. 5a (PRIOR ART)
FIG. 5a is a perspective view of a prior art MD yarn seaming loop.
Figure 5B:
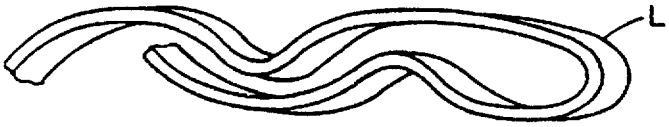
FIG. 5b is a perspective view of an orthogonal MD yarn seaming loop made in accordance with the present invention.

FIGS. 5a and 5b, respectively, illustrate a conventional seaming loop 50 in comparison with an orthogonal seaming loop L of the present invention. In conventional loop forming techniques, the MD yarn 51 is backwoven into the fabric adjacent to itself thereby inherently imparting twist and/or torque to the loop structure 50. In the present invention, the MD yarn is looped directly beneath itself and does not have any lateral offset which would impart such twist or torque to the seaming loop.

Figure 6:
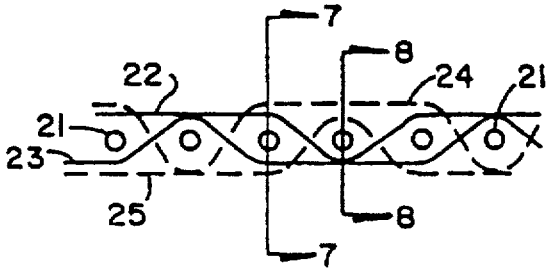
FIG. 6 is a schematic view of a second embodiment of a fabric made in accordance with the teachings of the present invention.
Figure 7:
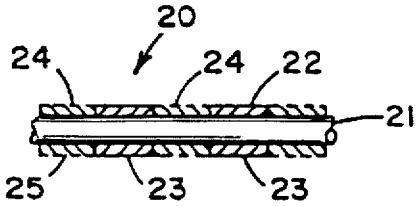
FIG. 7 is a cross-sectional view of the fabric depicted in FIG. 6 along line 7—7.
Figure 8:
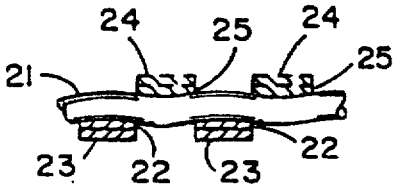
FIG. 8 is a cross-sectional view of the fabric depicted in FIG. 6 along line 8—8.

Referring to FIGS. 6, 7 and 8, there is shown an alternate embodiment of a fabric 20 made in accordance with the teachings of the present invention. Papermakers fabric 20 is comprised of a single layer of CMD weft yarns 21 flat woven with a system of stacked MD warp yarns 22–25 which weave in a selected repeat pattern. The MD yarn system comprises upper MD yarns 22, 24 which define floats on the top surface of the fabric 20 by weaving over three CMD yarns 21, dropping into the fabric to form a knuckle around the next one CMD yarn 21, and thereafter continuing to float over the next three CMD yarns 21 in the repeat.

Lower MD yarns 23, 25, weave directly beneath respective upper MD yarns 22, 24 in a vertically stacked relationship. The lower MD yarns weave in an inverted image of their respective upper MD yarns. Each lower MD yarn 23, 25 floats under three CMD yarns 21, weaves upwardly around the next one CMD yarn forming a knuckle and thereafter continues in the repeat to float under the next three CMD yarns 21.

As can be seen with respect to FIGS. 6 and 8, the knuckles formed by the lower MD yarns 23, 25 are hidden by the floats defined by the upper MD yarns 22, 24 respectively. Likewise the knuckles formed by the upper MD yarns 22, 24 are hidden by the floats of the lower MD yarns 23, 25 respectively. The caliper of the fabric proximate the knuckle area shown in FIG. 8, has a tendency to be somewhat greater than the caliper of the fabric at non-knuckle CMD yarns 21, shown in FIG. 7. However, the CMD yarns 21 around which the knuckles are formed become crimped which reduces the caliper of the fabric in that area as illustrated in FIG. 8.

Figure 9:
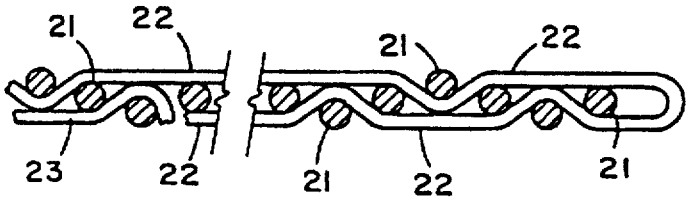
FIG. 9 illustrates the yarn orientation in the finished fabric depicted in FIG. 1 showing the end loop formed by one of the MD yarns.

As best seen in FIG. 9, seaming loops are formed by upper MD yarns 22. The respective lower MD yarns 23 are trimmed a selected distance from the fabric end and the upper MD yarns 22 are backwoven into the space vacated by the trimmed lower MD yarns 23.

Upper MD yarns 24 are similarly backwoven into the space vacated by trimming back lower MD yarns 25. However, as best seen in FIG. 10, upper MD yarns 24 are backwoven against the endmost CMD yarn 21.

Figure 10:
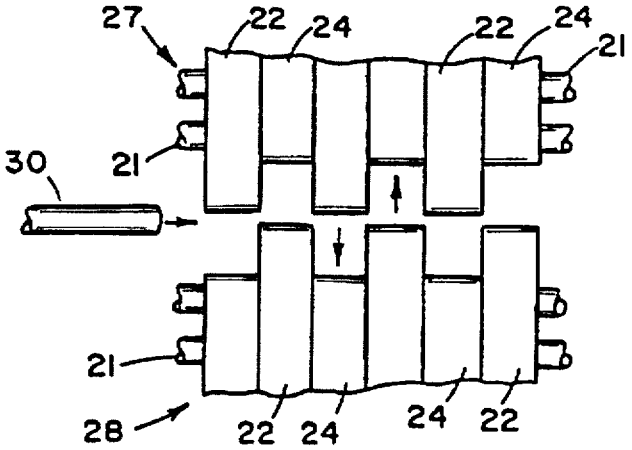
FIG. 10 is a top view of the opposing ends of a fabric constructed in accordance with FIG. 6 just prior to pin-seaming the ends together.

As illustrated in FIG. 10, a series of seaming loops is formed on each of the opposing fabric ends 27, 28. When the fabric is installed on papermaking equipment, the respective end loops formed by MD yarns 22 are intermeshed and a pintle 30 is inserted therethrough to lock the intermeshed series of loops together.

Since the seaming loops L are formed by backweaving MD yarns 22 directly beneath themselves, no lateral twist or torque is imparted on the loop and the loops are orthogonal with the plane of the fabric. This facilitates the intermeshing of the loop series of the opposing fabric ends 27, 28. The orthogonal loops are particularly advantageous where, as shown in FIG. 10, the MD yarns 22, 24 are 100% warp fill and adjacent loops are separated by individual MD yarns of the same width as the loop MD yarns 22. Lateral torque or twist on the seaming loops make the seaming process more difficult particularly where the loop-receiving gaps between the loops of one fabric end are essentially the same width as the loops on the opposing fabric end and vice versa.

Figure 11:
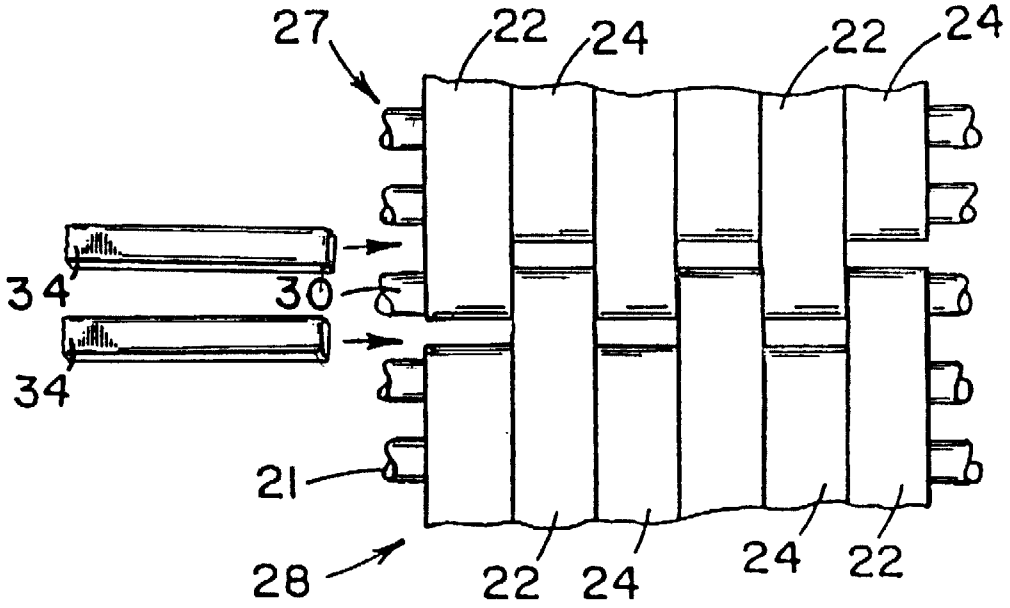
FIG. 11 is a top view of a fabric constructed in accordance with FIG. 6 having its opposing ends joined with a pintle just prior to the insertion of rectangular stuffer yarns in the seam area.

As illustrated in FIG. 11, after the opposing ends 27, 28 of the fabric are joined via pintle 30, spaces 32 exist which tend to increase the permeability of the fabric at the seam area in contrast with the body of the fabric. To reduce the permeability of the seam area to substantially equal the permeability of the body of the fabric, stuffer yarns 34 are provided. Preferably, a single stuffer yarn having a rectangular cross-section is inserted on each side of the pintle yarn 30 each through the series of end loops defined on the respective fabric ends 27, 28, but not within the intersecting area of the intermeshed end loops occupied by the pintle 30. The rectangular cross-section of the stuffer yarns is preferred to compliment the shape of the spaces 32 defined by the flat MD warp yarns 22, 24.

With reference to the fabric depicted in FIGS. 6–10, the loop forming MD yarns 22 are preferably backwoven approximately 2 inches while the non-loop forming MD yarns 24 are preferably backwoven 1 inch.

Preferably, the machine direction yarns are made of PET polyester with a hydrolysis resistance additive having cross-sectional dimensions of 0.25 mm by 1.06 mm. The cross machine direction yarns are made of the same material and alternate between 0.55 mm and 0.80 mm. Preferably, the MD yarns are woven 48 ends per inch. The number of CMD yarns per inch varies according to the desired permeability. Weaving 15 CMD picks per inch results in a fabric having a permeability of approximately a 150 cfm (cubic feet per meter); weaving 22 CMD picks per inch results in a fabric having a permeability of approximately a 50 cfm. After weaving the fabric is preferably heat set at a temperature of 425° F. at 15 pli (pounds per linear inch tension).

After the fabric has been heat set, the seaming loops are formed as noted above. Preferably, the loops extend approximately one-half the distance of the repeat pattern from the end of the fabric. Accordingly, the seaming loops on the fabric having the CMD yarns woven at 15 picks per inch are slightly longer than the seaming loops of a fabric having CMD yarns woven at 22 picks per inch.

In finishing the fabric before shipment to a papermill for installation on papermaking equipment, the seaming loops from the opposing fabric ends are intermeshed and an enlarged joining wire approximately 0.9 mm in diameter is inserted through the intersecting area. The seam is then heat set at approximately 300° F. at 15 pli tension. The oversized joining wire is then removed and the fabric is ready for shipment for installation on papermaking equipment.

When installed on papermaking equipment, the open fabric is threaded through the serpentine path of the papermaking equipment resulting in the opposing ends being approximate each other. The loops are then intermeshed at a pintle yarn 30 of approximately 0.7 mm in diameter is inserted through the intermeshed loops. The fabric is then placed under tension causing channels to be defined on opposing sides of the pintle as shown in FIG. 11, thereby causing the seam area to have a significantly greater permeability then the remainder of the fabric.

In order to reduce the permeability of the seam area, a rectangular stuffer yarn is inserted through each of the channels. Typically, this is accomplished through attaching a metallic lead wire to the end of the stuffer yarn, threading the lead wire through the channel and thereafter pulling the stuffer yarn into position. Preferably, the stuffer yarn is also made of PET polyester and has a cross-sectional dimension of 0.52 mm×1.40 mm. With the two stuffer yarns in place, the resultant seam has a permeability within 10 cfm of the permeability of the remainder of the fabric.

Figure 12:
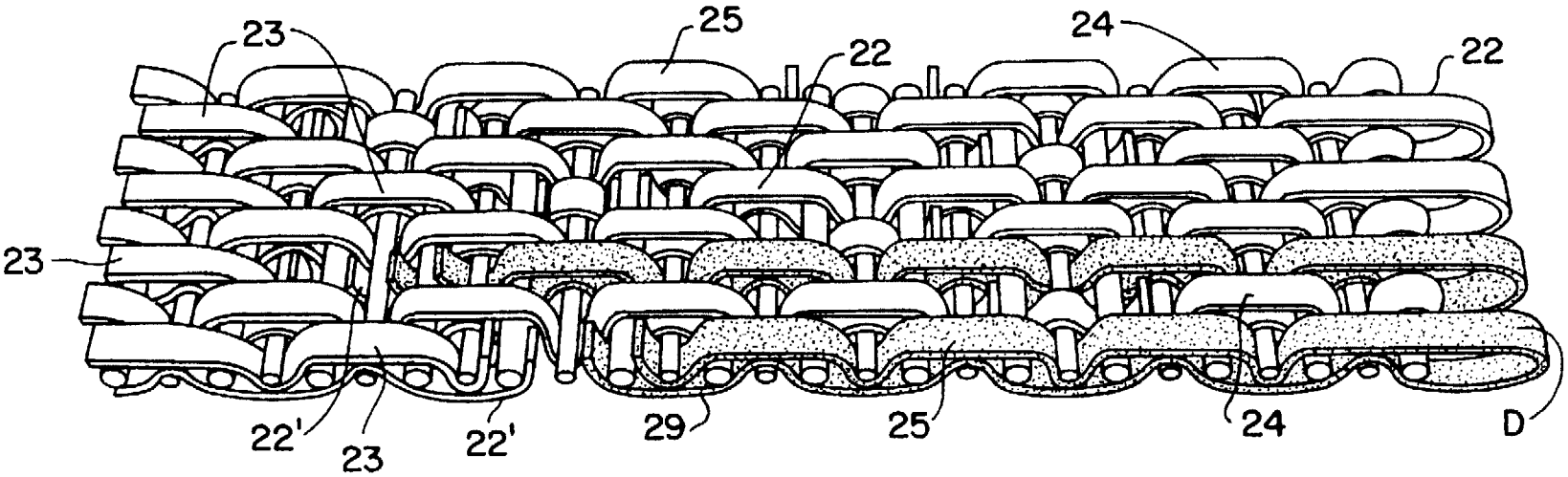
FIG. 12 is a perspective view of the bottom of a fabric constructed in accordance with FIG. 6 having selected seam loops formed from yarn segments made of a material more durable than the machine direction yarns.

As illustrated in FIG. 12, the durability of the seam can be improved by forming selected seaming loops with yarns segments made of a more durable material such as polyetheretherketone (PEEK). PEEK provides improved heat and hydrolysis resistance as compared to polyester. Preferably 50–100% of the end loops are formed with the more durable yarn segments. However, even forming as few as 25% of the seaming loops with end loops segments made of the more durable material has a significant effect on the durability of the seam.

With respect to the non-loop forming ends, upper MD yarns 24 are rewoven into the body of the fabric as discussed above in conjunction with FIGS. 4a–d and 10. Where some of the upper MD yarns 24 are used to form end loops, they are looped back upon themselves and rewoven as discussed above with respect to FIGS. 4a–d, 9 and 10.

Preferably, the more durable end loops D are formed by first trimming selected top layer yarns 22' back substantially equal with the trimming of the respective paired lower layer yarn 23. As clearly illustrated in the FIG. 12 bottom perspective view of the fabric, trimming of both MD yarns 22, 23 is done such that the yarn ends are directed to the lower side of the fabric to avoid any discontinuity on the upper side of the fabric which is the paper carrying side of the fabric.

Yarn segments 29, having the same geometric cross section as the MD yarns, but made of a more durable material, are then woven into the fabric ends in the spaces vacated by trimming both the respective upper and lower MD yarns 22, 23 to form end loops as illustrated in FIG. 12. Preferably, the ends of the yarn segments 29 also terminate on the lower side of the fabric to avoid discontinuities on the upper, paper carrying side of the fabric. Weaving the yarn segments 29 into the spaces vacated by the trimmed MD yarns maintains the uniformity of the fabric body proximate the seam of the fabric.

Preferably, the yarns segments 29 are pre-crimped to match the weave pattern of the fabric. This can be accomplished by weaving several of the more durable yarns into the side edges of the body of the fabric as the fabric body is made. The more durable yarns are removed and the sides of the fabric body are trimmed and finished in a conventional manner. The removed yarns are cut to a length of about 8–10 inches to be used as the yarn segments 29.

Preferably, the loops formed from the more durable yarn segments 29 are distributed in a substantially uniform manner across the width of the fabric. For example, the seam loops could comprise pairs of loops formed by durable yarn segments 29 alternating with pairs of loops formed by the MD yarn ends 22. Another example is that every fourth loop across the series of loops would be constructed using a more durable yarn segment 29.

Alternatively, the more durable end loops D, can be formed by using both the more durable and less durable yarns for the upper layer yarns 22 in the body of the fabric. For example, every eighth upper layer yarn 24 could be made of PEEK while every first through seventh upper layer yarns are made of polyester. The ends of the fabrics are then finished as set forth above with reference to FIGS. 4a–d, 9 and 10, with the upper MD yarns which are made of PEEK being formed into end loops. This results in one out of every four end loops being made of the more durable PEEK material. If the lower MD yarns are also polyester, the result is that a 6.25% substitution of the more durable PEEK yarns in the MD yarn system permits 25% of the end loops to be formed from the more durable PEEK MD yarns.

Although a specific embodiment and weave structure has been disclosed, this seam enhancement can be applied to improve the durability of pin seams used in conjunction with fabrics having different weave structures.

What I claim is:

1. A papermakers fabric comprising a system of *monofilament* MD yarns interwoven with a system of CMD yarns to define a body and opposing end portions of the fabric and a series of end loops formed on said opposing end portions, wherein selected end loops are made of yarn segments having the same geometric cross-section, but are made of a different material than the MD yarns which define said fabric body; and said yarn segments are interwoven into an end portion of the papermakers fabric in spaces vacated by trimming selected MD yarns back a selected distance within the end portion of the fabric, and do not extend into said fabric body, wherein the ends of the trimmed yarns and the ends of the selected end loop forming yarn segments all terminate on a common side of the fabric which is opposite to a paper carrying side of the fabric.

2. A papermakers fabric according to claim 1 wherein the system of MD yarns comprises pairs of upper and lower flat monofilament yarns and the yarn segments which form said selected end loops interweave in spaces vacated by respective pairs of upper and lower MD yarns which have been trimmed back within the fabric end portion.

3. A papermakers fabric according to claim 2 wherein said CMD yarns system is a single layer of CMD yarns.

4. A papermakers fabric according to claim 1 wherein said loop forming yarn segments are made of polyetheretherketone (PEEK).

5. A papermakers fabric according to claim 1 wherein said yarn segments are made of a material more durable than said MD yarns which define said fabric body.

6. A papermakers fabric according to claim 1, wherein each said end portion is approximately 2 inches in length in the machine direction.

7. A papermakers fabric comprising a system of *monofilament* MD yarns interwoven with a system of CMD yarns to define a body and opposing end portions of the fabric and a series of end loops formed on said opposing end portions, wherein selected end loops are made of yarn segments having the same geometric cross-section, but are made of a different material than the MD yarns which define said fabric body; and said yarn segments are interwoven into an end portion of the papermakers fabric in spaces vacated by trimming selected MD yarns back a selected distance within the end portion of the fabric, and do not extend into said fabric body, wherein said opposing series of end loops are intermeshed to define a seam area having [intersection] *intersecting* and non-intersecting areas, the fabric further comprising:

a pintle yarn disposed within the intersecting area of said intermeshed loops; and a stuffer yarn disposed within the non-intersecting area of each of said series of intermeshing loops parallel with said pintle yarn.

8. A papermakers fabric according to claim 7 wherein both said MD yarns and said stuffer yarns have a non-circular cross-section.

9. A papermakers fabric according to claim 7 wherein the permeability of the seam area is within 10 cfm of the permeability of said body of the fabric.

10. A papermakers fabric having opposing ends comprising:

a system of flat monofilament MD yarns interwoven with a system of CMD yarns to define a fabric body;

a series of end loops formed on each opposing end of said fabric body from yarns which are interwoven in at least the end of the fabric body wherein at least some of the end loops are formed from selected MD yarns which are looped back and interwoven with said CMD yarns directly beneath themselves; and selected end loops are made of a material which is more durable than the material of which at least 50% of the MD yarns are made.

11. A papermakers fabric according to claim 10 wherein said selected end loops are made of polyetheretherketone and said at least 50% of MD yarns are made of polyester.

12. A papermakers fabric according to claim 10 wherein at least some of the end loops which are made of said more durable material are formed from yarn segments which are interwoven into spaces vacated by trimming selected MD yarns back into the fabric body.

13. A papermakers fabric according to claim 10 wherein said system of CMD yarns is a single layer of CMD yarns.

14. A papermakers fabric comprising a system of *monofilament* MD yarns interwoven with a system of CMD yarns to define a body and opposing end portions of the fabric and a series of end loops formed on said opposing end portions, wherein selected end loops are made of yarn segments having the same geometric cross-section, but are made of a different material than the MD yarns which define said fabric body; and said yarn segments are interwoven into an end portion of the papermakers fabric in spaces vacated by trimming selected MD yarns back a selected distance within the end portion of the fabric, and do not extend into said fabric body, wherein at least some of the end loops are formed from the MD yarns which define said fabric body.

15. A method of forming seaming loops for a papermakers fabric comprising:

interweaving MD warp yarns with CMD weft yarns in a repeated pattern which defines a selected crimp in the MD yarns to define a fabric body having two sides along the machine direction and two ends, all of the MD warp yarns having the same geometric cross-section and at least one of said MD warp yarns woven proximate a side of the fabric body being made of a different material than the other MD warp yarns;

trimming back selected MD warp yarns a selected distance from at least one of said fabric ends;

removing said different material warp yarn from the side of the fabric body; and using segments of said different material warp yarn to form seaming loops by interweaving said yarn segments into spaces vacated by said trimming said selected MD yarns.

16. The method according to claim 15 further comprising selecting a material for said different material warp yarn which is more durable than the material from which said other MD warp yarns are made.

*17. A method of forming seaming loops for a papermakers fabric comprising interweaving MD warp yarns with CMD weft yarns in a repeated pattern to define a fabric body having two sides along the machine direction and two ends, all of the MD warp yarns having the same geometric cross-section, trimming back selected MD warp yarns a selected distance from at least one of said fabric ends, and using segments of yarns having a predetermined crimp to form seaming loops by interweaving said yarn segments into spaces vacated by said trimming said selected MD yarns, characterized in that:*

*at least one of said MD warp yarns woven proximate a side of the fabric body being made of a different material than the other MD warp yarns;*

*removing said different material warp yarn from the side of the fabric body; and*

*using selected portions of said removed yarns as said yarn segments.*

*18. The method according to claim 17 further comprising selecting a material for said different material warp yarn which is more durable than the material from which said other MD warp yarns are made.*

* * * * *